Dec. 29, 1959  E. BUECHTING  2,919,108
PIPE POSITIONING TOOLS
Filed March 11, 1957  2 Sheets-Sheet 1

*INVENTOR.*
EARL BUECHTING
BY Alfred W Petchaft
atty.

Dec. 29, 1959  E. BUECHTING  2,919,108
PIPE POSITIONING TOOLS
Filed March 11, 1957  2 Sheets-Sheet 2

INVENTOR.
EARL BUECHTING
BY

United States Patent Office 2,919,108
Patented Dec. 29, 1959

2,919,108

PIPE POSITIONING TOOLS

Earl Beuchting, Imperial, Mo.

Application March 11, 1957, Serial No. 645,126

3 Claims. (Cl. 254—139.1)

This invention relates to a new and useful plumber's tool and, more particularly, to a pipe positioning tool.

In the installation of copper tubing it has become the practice to cut the tubing into lengths, whereupon the plumber usually sets up a so-called "run of pipe" involving a number of such lengths connected by various joints. After the run is completely set up, the plumber "sweats" or solders all of the joints at one time. Frequently, however, the joints do not remain in proper alignment due to the necessary dimensional tolerances in the fittings and the weight of the run of pipe. Consequently, the fittings are not soldered in their proper position and the pipe or tubing is misaligned.

It is, therefore, a primary object of the present invention to provide a pipe positioning tool which will eliminate sagging of the pipe or tube and will properly align the joints.

It is also an object of the present invention to provide a pipe positioning tool which will hold the pipe and joint firmly in position while soldering the joint.

It is another object of the present invention to provide a pipe positioning tool of the type stated which is easy to operate and which eliminates the need for a helper during the soldering operation.

It is a further object of the present invention to provide a pipe positioning tool of the type stated which assists in increasing the accuracy of the plumbing work.

With the above and other objects in view, my invention resides in the novel features of form, construction, arrangement, and combination of parts presently described and pointed out in the claims.

In the accompanying drawings—

Fig. 1 is a front elevational view of a pipe positioning tool constructed in accordance with and embodying the present invention;

Figs. 2, 3, and 4 are sectional views taken along lines 2—2, 3—3, and 4—4, respectively, of Fig. 1;

Figure 1:
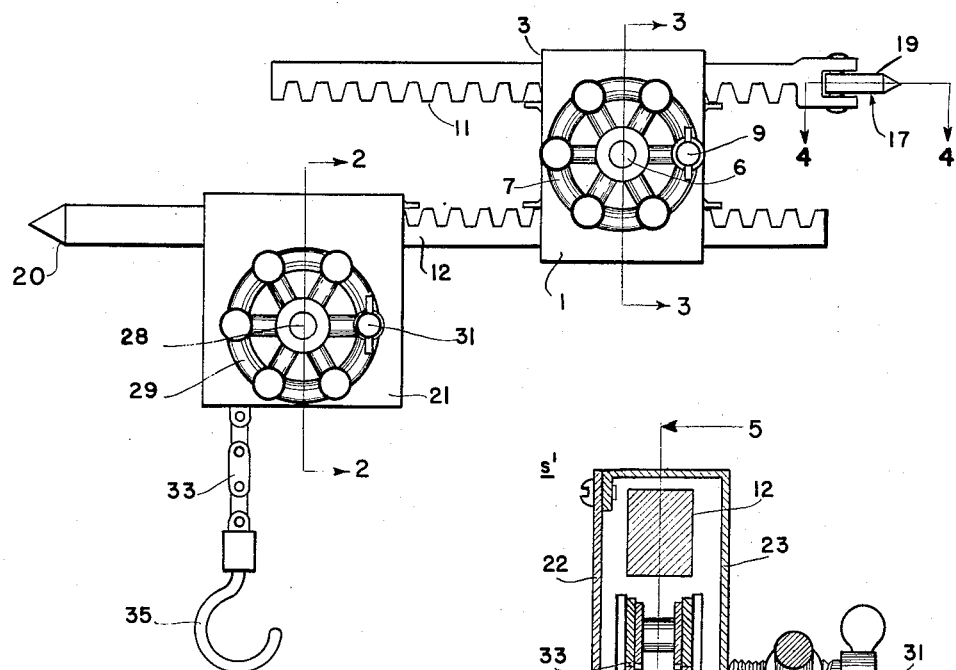
Figure 2:
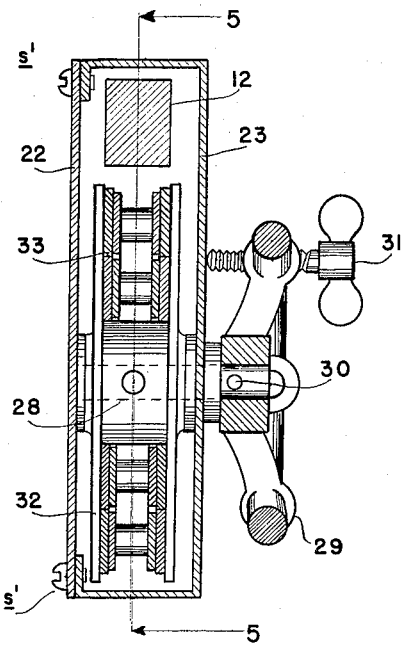
Figure 3:
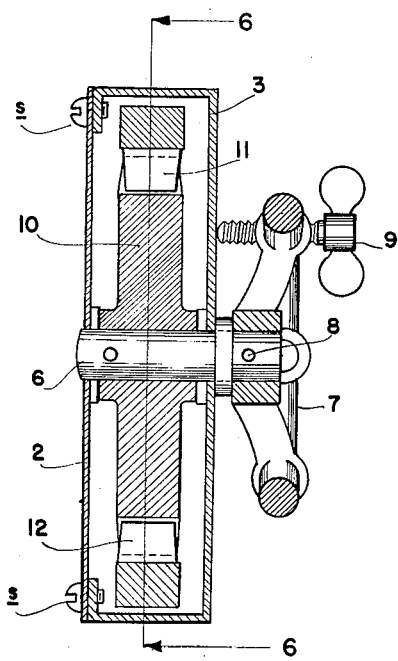
Figure 4:
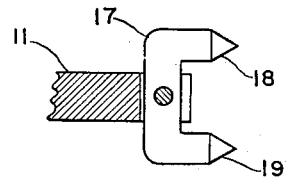

Referring now in more detail and by reference characters to the drawings, which illustrate a preferred embodiment of the present invention, A designates a pipe positioning tool including a hollow rectangular housing 1 having spaced parallel side walls 2, 3, and end walls 4, 5, the side wall 2 being removably secured to the housing 1 by screws s. Journaled in the side walls 2, 3, is a shaft 6, one end of which projects outwardly from the side wall 3 and is provided with a hand wheel 7 rigidly secured thereon by a set screw 8. Threaded into the hand wheel 7 and in spaced parallel relation to the shaft 6 is a wing-screw 9, one end of which is adapted to bear against the side wall 3. Keyed or otherwise rigidly secured to the shaft 6 within the housing 1 is a pinion 10 which meshes with upper and lower rack bars 11, 12, respectively, supported in spaced parallel relation by the housing 1, and being adapted to project through aligned apertures 13, 14, 15, 16, in the end walls 4, 5. It will be apparent that by rotating the hand wheel 7 it is possible to shift the rack bars 11, 12, longitudinally with respect to each other. As seen by reference to Fig. 1, one end of the upper rack bar 11 is provided with a somewhat rockable yoke 17 having laterally spaced, preferably sharp-pointed fingers 18, 19, while one end of the lower rack bar 12 is preferably tapered to a pointed end 20.

Figure 7:
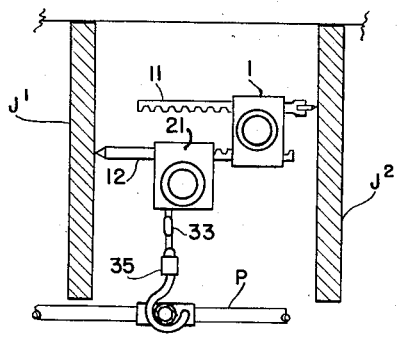
Fig. 7 is a diagrammatic view of the pipe positioning tool and showing the tool in use.
Figure 5:
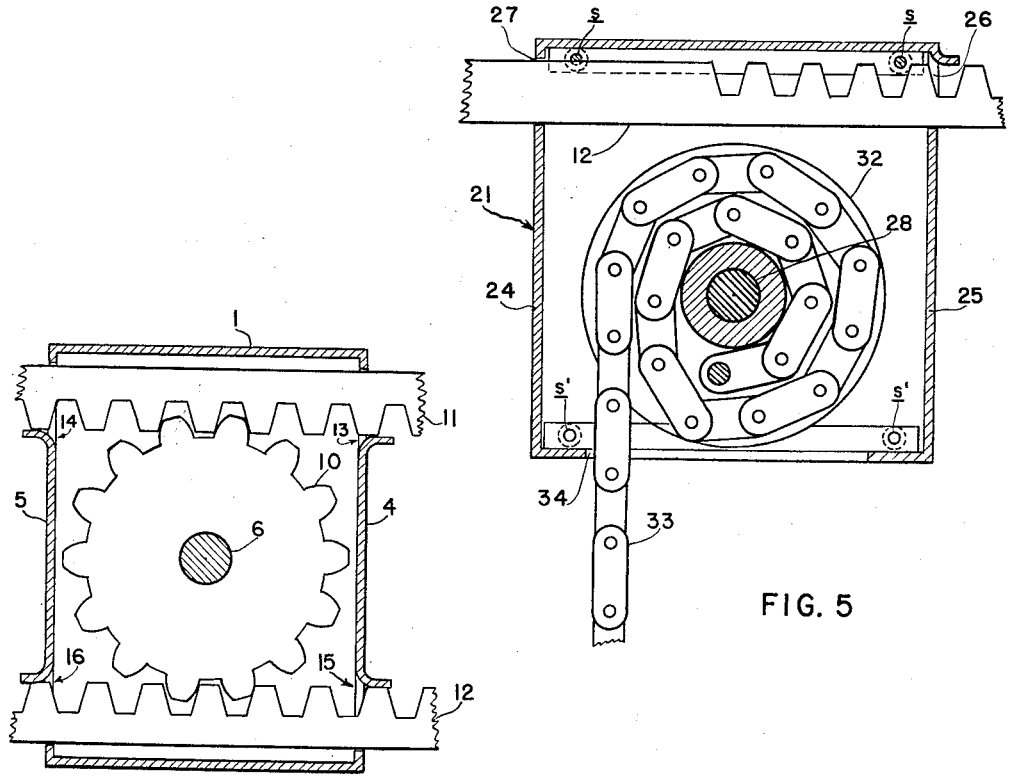
Fig. 5 is a fragmentary sectional view taken along line 5—5 of Fig. 2.
Figure 6:
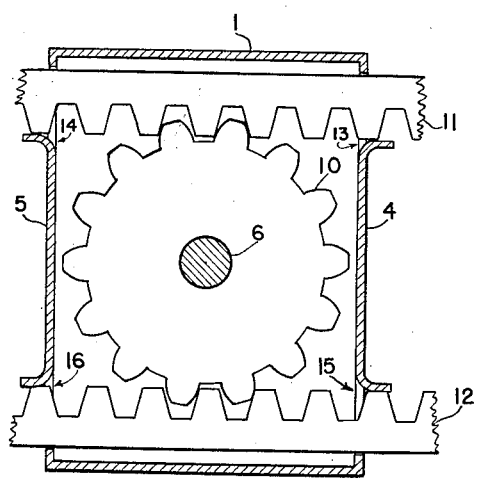
Fig. 6 is a fragmentary sectional view taken along line 6—6 of Fig. 3.

Provided for freely sliding movement along the lower rack bar 12 is a second hollow rectangular housing 21 having spaced parallel side walls 22, 23, the side wall 22 being removably secured to the housing 21 by screws s', and end walls 24, 25, the upper ends of which are formed with aligned apertures 26, 27, through which the lower rack bar 12 projects. Journaled in the side walls 22, 23, is a shaft 28, one end of which projects outwardly from the side wall 23 and is provided with a hand wheel 29 rigidly secured thereon by a set screw 30. Threaded into the hand wheel 29 and in spaced parallel relation to the shaft 28 is a wing-screw 31, one end of which is adapted to bear against the side wall 23. Rigidly secured to the shaft 28 within the housing 21 is a small windlass type drum 32 and fastened at its inner end thereto by a pivotal connection is a length of roller chain 33. The roller chain 33 projects through an aperture 34 in the bottom of the housing 21 and the depending end of the roller chain 33 is provided with a swivel hook 35. It will be apparent that by rotating the hand wheel 29, the drum 32 will rotate and the roller chain 33 will be wound up around the drum 32, whereby it is possible to raise and lower the swivel hook 35. It should be noted in this connection that the aperture 34 is substantially equal in length to the diameter of the drum 32 and, therefore, the roller chain 33 can be wound up on the drum 32 in either direction for convenience in positioning the swivel hook 35. This also makes it possible, where necessary, to apply a certain amount of angular pull, although this same result can also be obtained by manually shifting the housing 21 to the right or left (reference being made to Fig. 7), so that the roller chain 33 will hang downwardly at an angle rather than in the vertical position shown.

In use, the tool A is telescoped so that the distance between the yoke fingers 18, 19, and the pointed end 20 is small enough to permit the tool to be easily positioned between a pair of joists $J^1$, $J^2$. The hand wheel 7 is then rotated so as to shift the rack bars 11, 12, outwardly in relation to each other and drive the pointed end 20 and the pointed fingers 18, 19, firmly against the joists $J^1$, $J^2$, whereupon the wing-screw 9 is turned down against the side wall 3 to lock the hand wheel against rotation. In this connection, it should be noted that the yoke 17 acts to self-set the tool A so that the pointed fingers 18, 19, and the pointed end 20 can be quickly and easily set against the joists $J^1$, $J^2$. The hand wheel 29 is then rotated to pull the roller chain 33 up or down as needed so that the swivel hook 35 can be looped around the pipe P and draw it into properly aligned position, whereupon the wing-screw 31 is turned down against the side wall 23. The pipe P is held in this position until the joint has been sweated. It has been found in connection with the present invention that by judicious use of a few pipe positioning tools of the type herein described, an extensive run of pipe can be set up so that the soldering or sweating can be carried out quickly, accurately and all at one time.

It should be understood that changes and modifications in the form, construction, arrangement, and combination of the several parts of the pipe positioning tools may be made and substituted for those herein shown and described without departing from the nature and principle of my invention.

Having thus described my invention, what I claim and desire to secure by Letters Patent is:

1. A pipe positioning tool comprising a first housing having a flat outwardly presented face, a pair of bar-like elements slidably mounted in and extending through said housing, a shaft rotatably mounted in said housing, driving means in said housing and mounted on said shaft for shifting said elements in opposite directions, a handle on said shaft outwardly of said first housing for actuating said driving means, a locking-screw operatively mounted in and extending through the handle in radially spaced parallel relation to the shaft and being adapted for endwise locking engagement against the face of the flat outwardly face of said first housing whereby to lock said bar-like elements in position, a second housing slidably mounted on one of said bar-like elements, said second housing also having a flat outwardly presented face, a rotatable element in said second housing, pipe holding means operatively connected to said rotatable element, a handle outwardly of said second housing and connected to said rotatable element for moving said pipe holding means toward and away from said rotatable element, and a locking-screw operatively mounted to last named handle and cooperating with the flat of the second housing for locking said pipe holding means in any one of several positions in outwardly extending relation to said second housing.

2. A pipe positioning tool comprising a first housing having a flat outwardly presented face, a pair of rack bars slidably mounted in and extending through said housing, one end of each said rack bar having pointed gripper means thereon, one of said gripper means including a rockable yoke, a shaft rotatably mounted in said housing, a pinion mounted on said shaft and engageable with said rack bars for shifting said rack bars in opposite directions, a handle on said shaft outwardly of said housing for actuation of said pinion, a first locking screw operatively mounted in and extending through the handle in radially spaced parallel relation to the shaft and being adapted for endwise locking engagement against the outwardly presented face of the first housing whereby to lock said pinion against rotation, a second housing slidably mounted on one of said rack bars and being provided internally thereof with a rotatable drum member, said second housing also having an outwardly presented flat face, a flexible member wrapped around said drum element and adapted to project outwardly of said second housing, a hook operatively connected to one end of said flexible member, a handle outwardly of said second housing for rotating said drum member, and a locking screw operatively mounted in and extending through said last mentioned handle and being adapted for endwise locking engagement against the end face of the second housing for locking said drum member against rotation.

3. A pipe positioning tool comprising a first housing, a pair of laterally spaced parallel bar elements slidably mounted in and extending through said housing, one end of each of said bar elements having gripper means thereon, one of said gripper means including a yoke rockably mounted on the outer end of the bar element with which it is associated for swivelling movement about an axis parallel to the direction of lateral spacing between the bars so that, when the pipe positioning tool is disposed in such position that the bars are locked in vertical alignment one above the other, the yoke will rock about a vertical axis, said yoke being provided with a plurality of pointed prongs which are laterally spaced from each other on opposite sides of the axis about which said yoke rocks, actuating means on said first housing for shifting the bar elements in opposite directions relative to each other, handle means associated with the first housing for operating the actuating means, locking means operatively associated with the handle means and actuating means for locking said means in any selected position, a second housing slidably mounted on one of the bar elements independently of the first housing and in laterally spaced relation thereto, pipe holding means operatively mounted within said second housing and extending outwardly therefrom, second actuating means in said operatively mounted second housing and connected to the pipe holding means for causing the pipe holding means to move inwardly and outwardly with respect to the housing, second handle means associated with the second housing for operating the second actuating means, and locking means operatively associated with the second handle means and second actuating means for locking said means in any selected position.

References Cited in the file of this patent
UNITED STATES PATENTS

| | | |
|---|---|---|
| 508,866 | Butcher | Nov. 14, 1893 |
| 909,364 | Carlson | Jan. 12, 1909 |
| 1,099,834 | Baldwin et al. | June 9, 1914 |
| 1,550,751 | Sinkler | Aug. 25, 1925 |
| 2,333,033 | Mraz | Oct. 26, 1943 |
| 2,415,205 | Gartin | Feb. 4, 1947 |
| 2,713,983 | Kay | July 26, 1955 |

FOREIGN PATENTS

| | | |
|---|---|---|
| 6,817 | Great Britain | Mar. 22, 1909 |